(12) United States Patent
Iijima et al.

(10) Patent No.: US 6,759,594 B2
(45) Date of Patent: Jul. 6, 2004

(54) WHEEL SPEED SENSOR, METHOD FOR PRODUCING THE SAME, TERMINAL AND METHOD FOR WELDING TERMINAL AND ELECTRIC WIRE

(75) Inventors: Jun Iijima, Nagano (JP); Kazuhiro Ota, Nagano (JP); Shigeru Fukazawa, Nagano (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 0 days.

(21) Appl. No.: 10/214,154

(22) Filed: Aug. 8, 2002

(65) Prior Publication Data

US 2003/0033875 A1 Feb. 20, 2003

(30) Foreign Application Priority Data

Aug. 16, 2001 (JP) .................................. P.2001-247076
Aug. 27, 2001 (JP) .................................. P.2001-255752
Aug. 28, 2001 (JP) .................................. P.2001-257090

(51) Int. Cl.[7] ............................................. H01R 4/02
(52) U.S. Cl. ....................... 174/135; 174/94 R; 29/860; 439/874
(58) Field of Search ....................... 174/68.1, 68.2, 174/72 B, 72 C, 73.1, 84 C, 94 R, 135; 29/860; 439/874

(56) References Cited

U.S. PATENT DOCUMENTS

| | | | | |
|---|---|---|---|---|
| 1,706,412 A | * | 3/1929 | Roberts | 439/874 |
| 2,800,637 A | * | 7/1957 | Nicolaus | 439/874 |
| 3,437,774 A | * | 4/1969 | Snider | 200/275 |
| 3,656,092 A | * | 4/1972 | Swengel et al. | 439/730 |
| 3,742,122 A | * | 6/1973 | Blavos et al. | 174/94 R |
| 4,186,289 A | * | 1/1980 | Ito et al. | 200/284 |
| 4,196,960 A | * | 4/1980 | Gelfand | 439/874 |
| 5,025,554 A | * | 6/1991 | Dohi | 29/860 |
| 5,222,811 A | * | 6/1993 | Miyoshi | 374/208 |
| 5,808,260 A | * | 9/1998 | Asakura et al. | 219/56.22 |
| 6,175,080 B1 | * | 1/2001 | Nightingale | 174/75 C |
| 6,364,701 B1 | * | 4/2002 | O'Sullivan et al. | 439/579 |
| 6,538,203 B1 | * | 3/2003 | Nolle et al. | 174/84 R |

FOREIGN PATENT DOCUMENTS

| | | | | |
|---|---|---|---|---|
| JP | 54011487 A | * | 1/1979 | .................. 29/860 |
| JP | 4-45946 | | 7/1992 | |
| JP | 6-218552 | | 8/1994 | |
| JP | 10-132836 | | 5/1998 | |
| JP | 11-14644 | | 1/1999 | |
| JP | 2000-206130 | | 7/2000 | |

* cited by examiner

*Primary Examiner*—Dean A. Reichard
*Assistant Examiner*—Adolfo Nino
(74) *Attorney, Agent, or Firm*—McGuireWoods LLP

(57) ABSTRACT

A wheel speed sensor has a detection element having at least one lead for detecting a wheel speed, at least one terminal portion connected to the lead of the detection element, a holder portion having a detection element fitting portion fitting the detection element therein and a terminal portion fitting portion fitting the terminal portion therein, and a resin sealed portion sealing the holder portion in a state the detection element and the terminal portion connected with an electric wire are held in the holder portion. The detection element fitting portion and the terminal portion fitting portion are disposed such that the lead of the detection element is brought into abutment with or proximity to a predetermined location of the terminal portion when the detection element and the terminal portion are fitted in the detection element fitting portion and the terminal portion fitting portion, respectively.

18 Claims, 9 Drawing Sheets

WHEEL SPEED SENSOR, METHOD FOR PRODUCING THE SAME, TERMINAL AND METHOD FOR WELDING TERMINAL AND ELECTRIC WIRE

BACKGROUND OF THE INVENTION

1. Field of the Invention

The present invention relates to a wheel speed sensor for use in detecting wheel speeds of vehicles such as automobiles and motorcycles. Further, the present invention relates to a terminal to which an electric wire is connected in which a plurality of thin metallic wires are bundled together to constitute a conducting portion and a method for welding the electric wire to the terminal.

2. Description of the Related Art

In general, wheel speed sensors attached to wheels of a vehicle, respectively, to detect wheel speeds of a running vehicle are designed to detect the rotation of rotors which rotate together with axles coupled to the respective wheels. The rotors contain a magnetic material and magnetic sensors such as Hall ICs and MR elements are used to detect the rotation of the rotors.

However, in the event that the magnetic sensors such as Hall ICs are provided directly on the axle portions of the running vehicle, there is a risk that the sensors maybe damaged by flying stones, and moreover, a connecting portion between lead portions and electric wires is liable to be disconnected.

To cope with this problem, it is a conventional common practice in wheel speed sensors to mold a detection element such as a Hall IC by a synthetic resin together with a connecting portion with the cords to improve the durability thereof.

As an example of the resin-sealed wheel speed sensor, a wheel speed sensor disclosed in JP-A-2000-206130 is conventionally known.

The construction of this conventionally known wheel speed sensor will be briefly described with reference to FIG. 11.

A wheel speed sensor has a detection element 110 such as a Hall IC, electric wires 112 connected to the detection element, an accommodating portion 113 for accommodating the detection element 110 and a lid unit 114 for covering an upper face of the accommodating portion 113 in which the detection element 110 is accommodated.

The electric wires 112 are connected to terminals 111 of the detection element 110 by welding or clamping. Then, the detection element 110 to which the electric wires 112 are so connected is accommodated in the accommodating portion 113.

The lid unit 114 is attached to the upper face of the accommodating portion 113 in which the detection element 110 is accommodated.

Finally, an assembly into which the detection element 110, the electric wires 112, the accommodating portion 113 and the lid unit 114 are assembled is disposed within a mold (comprising a stationary mold half and a movable mold half) (not shown) so that the whole periphery of the assembly is sealed with a synthetic resin, whereby the wheel speed sensor is formed.

As has been described heretofore, in the conventional wheel speed sensor, the electric wires have to be connected to the terminals of the detection element by welding or clamping, the detection element to which the electric wires are connected has to be accommodated in the accommodating portion, and the lid unit has to be mounted on the accommodating portion prior to sealing with the resin, this causing a problem that a number of man hours are required to assemble the respective constituent component parts.

In addition, in this construction in which the detection element is accommodated in the accommodating portion for sealing with the resin after the electric wires have been connected to the terminals of the detection element, stress is applied to the terminals and the electric wires before they are accommodated in the accommodating portion, and this may trigger a risk that the connection between the detection element and the electric wires is disconnected.

In addition, in order to position an assembly to which the electric wires are connected within a mold, positioning projections are provided on an accommodating portion and a lid unit in such a manner as to project therefrom, and positioning portions are formed in the mold.

In resin molding the assembly, the assembly is placed in an opened mold (a stationary mold half) and is positioned by bringing the positioning projections into engagement with the positioning portions on the mold side, and thereafter, the assembly is clamped with the stationary mold half and a movable mold half and is them molded with a resin to form a housing.

In the wheel speed sensor disclosed in the aforesaid JP-A-2000-206130, of the positioning projections provided at a plurality of positions around the periphery of the assembly, firstly, the projections corresponding to the positioning portions on the stationary mold half are brought into engagement with the same positioning portions, and then the positioning projections corresponding to the positioning portions on the movable mold half are brought into engagement with the same positioning projections. Due to this, the posture and position of the assembly within the cavity tend to remain unstable until the assembly is clamped by the mold halves. Since the assembly is placed in the cavity while the electric wires are connected to the assembly with an L-shape, the assembly is liable to be twisted or floated within the cavity. When there is caused a deviation in position of the assembly within the cavity, it is not possible to form a uniform resin sealed portion, whereby the penetration of water or the like into the assembly from an exposed portion thereof is liable to happen.

In addition, in the event that a plurality of positioning portions are attempted to be provided on both the assembly and the mold (the stationary and movable mold halves), a production cost for the assemblage of the component parts is increased, and, time has to be spent in placing the assembly in the mold and therefore the assemblage of the component parts is deteriorated. Moreover, the mold and the wheel speed sensor itself have to be enlarged.

Next, a conventional method for welding an electric wire in which a plurality of thin metallic wires are bundled together to constitute a conducting portion (a signal wire) to another member will be described with reference to FIGS. 12 and 13.

FIG. 12 shows an electric wire 210 having a certain thickness being welded to a metallic terminal 211.

An electrode 212 for use in the welding is constituted by two electrodes; one of them is one electrode 212a which contacts a conducting portion 213 of the electric wire 210 and the other is the other electrode 212b which contacts the terminal 211. A recessed groove 214 is formed in the one electrode 212a for accommodating therein the conducting portion 213.

The conducting portion 213 is held in the recessed groove 214 formed in the one electrode 212a and is then pressed against the terminal 211 by the one electrode 212a.

When welding, electric current is allowed to flow from the one electrode 212a toward the other electrode 212b through the conducting portion 213 and the terminal 211 (as shown by a narrow A in the figure). The conducting portion 213 and the terminal 211 are heated by the current for welding.

Thus, in a case where the electric wire 210 of a predetermined thickness is welded to the terminal 211, since the conducting portion 213 is accommodated in the recessed groove 214 in the electrode 212, the conducting portion 213 can be welded to the terminal 211 without getting discrete to the individual thin metallic wires when welding.

FIG. 13 shows an electric wire 215 of a diameter which is smaller than that of the electric wire shown in FIG. 12 being welded to a terminal 211. In addition, FIG. 13 shows that a conducting portion 216 gets discrete to individual thin electric wires 219.

In this case, too, one electrode 218a is disposed on a conducting portion 216 side in which a recessed groove 217 matching the conducting portion 216 in size is formed, while the other electrode 218b which is flat is disposed on a terminal 211 side.

Note that in the event that the diameter of the electric wire is small, the individual thin metallic wires 219, 219 . . . constituting the conducting portion 216 are also considerably thin. Thus, the conducting portion 216 constituted by the thin metallic wires 219 is originally easy to get discrete.

Furthermore, the depth of the recessed groove 217 formed in the one electrode 218a for accommodating the conducting portion 216 tends to be shallow.

Thus, it is difficult to align the shallow recessed groove 217 in the one electrode 218a with the thin conductor 216 so as to snugly accommodate the conductor 216 therein and press it against the terminal 211 for welding.

Consequently, in a case where the electric wire 215 having the thin conducting portion 216 is welded, it is preferable to use a flat electrode having no recessed groove 217 formed therein as the electrode 218a which is pressed against the conducting portion 216.

However, with the thin conducting portion 216 which is originally easy to get discrete, in the event that a flat electrode is attempted to be used for welding, there is a high possibility that the conducting portion gets discrete more easily.

In the event that the conducting portion gets discrete, as shown in FIG. 13, when attempting to weld the thin electric wire, a contact area of the individual discrete thin metallic wires with the electrode increases and this causes a problem that even if electric current is allowed to flow, generating heat becomes difficult.

Furthermore, even if welding can be attained, there is caused a problem that the overall strength of the conducting portion is remarkably deteriorated due to the influence of heat on the individual thin metallic wires.

On the other hand, in the event that welding is carried out with the conducting portion being in a discrete condition, and that a plurality of terminals are provided in close vicinity to each other, there is caused a risk that the discrete thin metallic wires may be brought into contact with the other terminals which are located nearby.

In addition, JP-B-4-45946 and JP-A-6-218552 describe methods for welding a conducting portion while preventing the conducting portion from getting discrete.

According to the method described in JP-B-45946, in welding an electric wire to a terminal or the like, since a restraining jig for restraining the conducting portion is used, the conducting portion can be prevented from getting discrete.

With this method, however, since the restraining jig has to be used, there is caused a problem that man hours are increased for attachment and detachment of the restraining jig at the time of welding.

Furthermore, according to the description in JP-A-6-218552, there is provided a welding method in which a terminal having a curved surface and electrodes having curved surfaces which match the curved surface of the terminal are used, and therefore, this method cannot be adopted in a case where welding is performed to a flat terminal.

SUMMARY OF THE INVENTION

The invention was made with a view to solving the problems, and an object thereof is to provide a wheel speed sensor which enables the assemblage of respective component parts with fewer man hours in sealing the wheel speed sensor with a resin, and which makes it difficult for stress to be applied to a connecting portion between a detection element and terminals, so that a disconnection between the detection element and the terminal portions is made difficult to occur.

Further, another object of the invention is to provide a wheel speed sensor which ensures the proper positioning thereof within a mold and a method for producing the same wheel speed sensor which can provide a good assemblage of component parts.

Moreover, a still another object thereof is to provide a terminal and a welding method which can prevent the conductor portion from getting discrete and enable a welding which requires fewer man hours.

To attain the above objects, the present invention is characterized as follows.

(1) A wheel speed sensor comprising:
  a detection element having at least one lead, for detecting a wheel speed;
  at least one terminal portion connected to the lead of the detection element;
  a holder portion having a detection element fitting portion fitting the detection element therein and a terminal portion fitting portion fitting the terminal portion therein;
  an electric wire welded on the terminal portion; and
  a resin sealed portion sealing the holder portion in a state that the detection element and the terminal portion are held in the holder portion and the electric wire is connected with the terminal portion,
  wherein the detection element fitting portion and the terminal portion fitting portion are disposed such that the lead of the detection element is brought into abutment with or proximity to a predetermined location of the terminal portion when the detection element and the terminal portion are fitted in the detection element fitting portion and the terminal portion fitting portion, respectively.

(2) The wheel speed sensor according to (1), wherein the lead of the detection element and the predetermined location of the terminal portion are connected to each other by welding.

(3) The wheel speed sensor according to (1), wherein a bent portion is formed in the predetermined location of the terminal portion.

(4) The wheel speed sensor according to (1), wherein the detection element is disposed on an end portion of the holder portion.

(5) The wheel speed sensor according to (1), wherein the holder portion further comprises an accommodating groove accommodating the lead of the detection element, the terminal portion fitting portion being formed in the accommodating groove.

(6) The wheel speed sensor according to (1), wherein the terminal portion fitting portion comprises a plurality of terminal portion fitting portions, and wherein the holder portion includes a shielding plate formed between the adjacent terminal portion fitting portions.

(7) The wheel speed sensor according to (1), wherein the terminal portion is made of a metal, wherein the terminal portion includes a holding portion formed in the vicinity to a location of the terminal to which the electric wire is welded, for holding the electric wire in a bundled state, and wherein the electric wire is welded on the terminal portion in a state that the terminal portion is fitted into the holder portion.

(8) The wheel speed sensor according to (7), wherein the holding portion is a notch holding the electric wire therein.

(9) The wheel speed sensor according to (7), wherein the terminal portion is formed into a substantially flat plate and wherein the terminal portion comprises a weld portion to which electric wire is welded and a holding piece which is bent from the weld portion at a position where a distal end of the electric wire is located when the electric wire is welded to the weld portion, and wherein the holding portion is formed in the holding piece.

(10) A wheel speed sensor comprising:

a detection element for detecting a wheel speed;

at least one terminal portion connected to the detection element;

a holder portion holding the detection element and the terminal portion;

an electric wire welded on the terminal portion;

a resin sealed portion sealing the holder portion in a state that the detection element and the terminal portion are held in the holder portion and the electric wire is connected with the terminal portion; and a rod-like projection projectedly formed on the holder portion, wherein when the holder portion is sealed with the resin, the rod-like projection has one end positioned outside a cavity in a mold and the outer end supporting the holder portion in a floating fashion within the cavity, and wherein after the holder portion is sealed with the resin, a portion of the one end of the rod-like projection which projects outwardly of the resin sealed portion is removed.

(11) The wheel speed sensor according to (10), wherein the rod-like projection has a polygonal cross section.

(12) The wheel speed sensor according to (11), wherein the single rod-like projection is provided on the holder portion.

(13) The wheel speed sensor according to (10), wherein the detection element is disposed on an end portion of the holder portion.

(14) The wheel speed sensor according to (10), wherein a flange portion is formed in the other end side of the rod-like projection.

(15) The wheel speed sensor according to (10), wherein a front surface of the resin sealed portion around the rod-like projection is formed in a concave surface.

(16) The wheel speed sensor according to (10), wherein the terminal portion is made of a metal, wherein the terminal portion includes a holding portion formed in the vicinity to a location of the terminal to which the electric wire is welded, for holding the electric wire in a bundled state, and wherein the electric wire is welded on the terminal portion in a state that the terminal portion is fitted into the holder portion.

(17) The wheel speed sensor according to (16), wherein the holding portion is a notch holding the electric wire therein.

(18) The wheel speed sensor according to (16), wherein the terminal portion is formed into a substantially flat plate and wherein the terminal portion comprises a weld portion to which electric wire is welded and a holding piece which is bent from the weld portion at a position where a distal end of the electric wire is located when the electric wire is welded to the weld portion, and wherein the holding portion is formed in the holding piece.

(19) A wheel speed sensor comprising:

a detection element for detecting a wheel speed;

at least one terminal portion connected to the detection element;

a holder portion holding the detection element and the terminal portion;

an electric wire welded on the terminal portion;

a resin sealed portion sealing the holder portion in a state that the detection element and the terminal portion are held in the holder portion and the electric wire is connected with the terminal portion; and a rod-like projection projectedly formed on the holder portion, the rod-like portion being adapted to support the holder portion within a cavity in a floating fashion from the outside when the holder portion is sealed with the resin, the rod-like projection being positioned without projecting from a front surface of the resin sealed portion.

(20) The wheel speed sensor according to (19), wherein the terminal portion is made of a metal, wherein the terminal portion includes a holding portion formed in the vicinity to a location of the terminal to which the electric wire is welded, for holding the electric wire in a bundled state, and wherein the electric wire is welded on the terminal portion in a state that the terminal portion is fitted into the holder portion.

(21) The wheel speed sensor according to (20), wherein the holding portion is a notch holding the electric wire therein.

(22) The wheel speed sensor according to (20), wherein the terminal portion is formed into a substantially flat plate and wherein the terminal portion comprises a weld portion to which electric wire is welded and a holding piece which is bent from the weld portion at a position where a distal end of the electric wire is located when the electric wire is welded to the weld portion, and wherein the holding portion is formed in the holding piece.

(23) A method for producing a wheel speed sensor comprising the steps of:
holding a detection element and a terminal portion in a holder portion;
welding an electric wire on a terminal portion;
placing the holder portion in a mold in such a manner as to position one end of a rod-like projection projectedly formed on the holder portion outside a cavity and allowing the other end of the rod-like projection to support the holder portion in a floating fashion within the cavity;
clamping the holder portion with the mold;
sealing the holder portion with a resin while the holding portion is being supported in the floating fashion within the cavity; and
removing a portion of the one end of the rod-like projection which projects outwardly of a resin-sealed portion after the resin sealing has been completed.

(24) The method for producing a wheel speed sensor according to (23), wherein the terminal portion has a holding portion formed in the vicinity to a location of the terminal to which the electric wire is welded, for holding the electric wire in a bundled state, wherein the electric wire is welded in a stat that the electric wire is held on the holding portion after the terminal portion is previously fitted into the holder portion.

(25) A terminal made of a metal to which an electric wire in which a plurality of thin metallic wires are bundled together to constitute a conducting portion is connected by welding, comprising:
a holding portion formed in the vicinity to a location of the terminal to which the conducting portion is welded, for holding the conducting portion in a bundled state.

(26) The terminal according to (25), wherein the holding portion is a notch holding the conducting portion therein.

(27) The terminal according to (25), wherein the terminal is formed into a substantially flat plate and comprises a weld portion to which the conducting portion is welded and a holding piece which is bent from the weld portion at a position where a distal end of the conducting portion is located when the conducting portion is welded to the weld portion, and
wherein the holding portion is formed in the holding piece.

(28) A method for welding an electric wire in which a plurality of thin metallic wires are bundled together to constitute a conducting portion to a terminal made of a metal, the method comprising the steps of:
preparing a terminal according to (25), the terminal having a holding portion formed in the vicinity to a location of the terminal to which the conducting portion is welded, for holding the conducting portion in a bundled state;
holding the conducting portion in the holding portion; and
welding the conducting portion and the terminal together.

DETAILED DESCRIPTION OF THE PREFERRED EMBODIMENTS

A preferred embodiment of the invention will be described below with reference to the accompanying drawings.

The embodiment will describe a wheel speed sensor for use in detecting wheel speeds of vehicles such as automobiles and motorcycles and a method for producing the same wheel speed sensor with reference to the accompanying drawings.

Referring to FIGS. 1 to 5C, the construction of the wheel speed sensor will be described.

Figure 1:
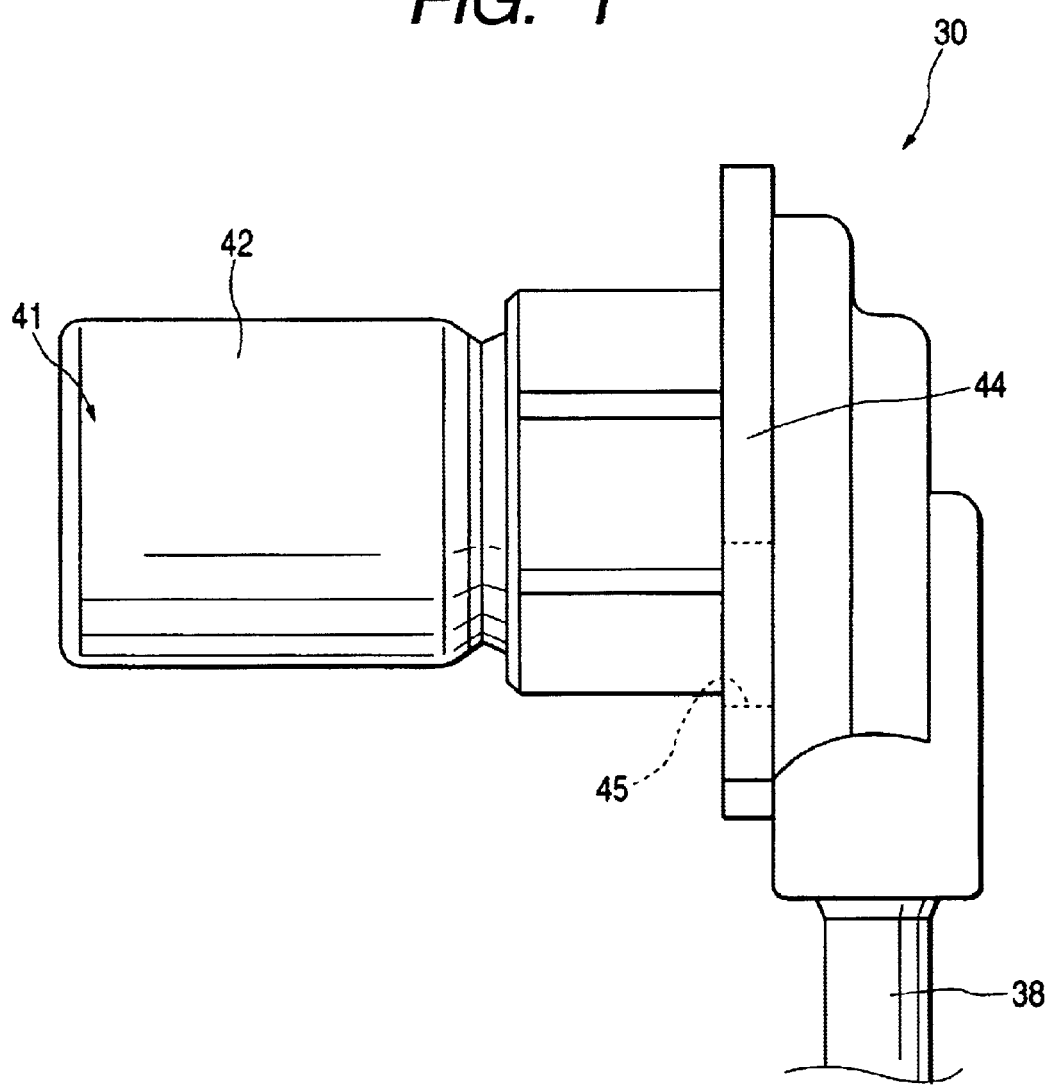
FIG. 1 is a side view showing the external appearance of a wheel speed sensor according to the invention.
Figure 2:
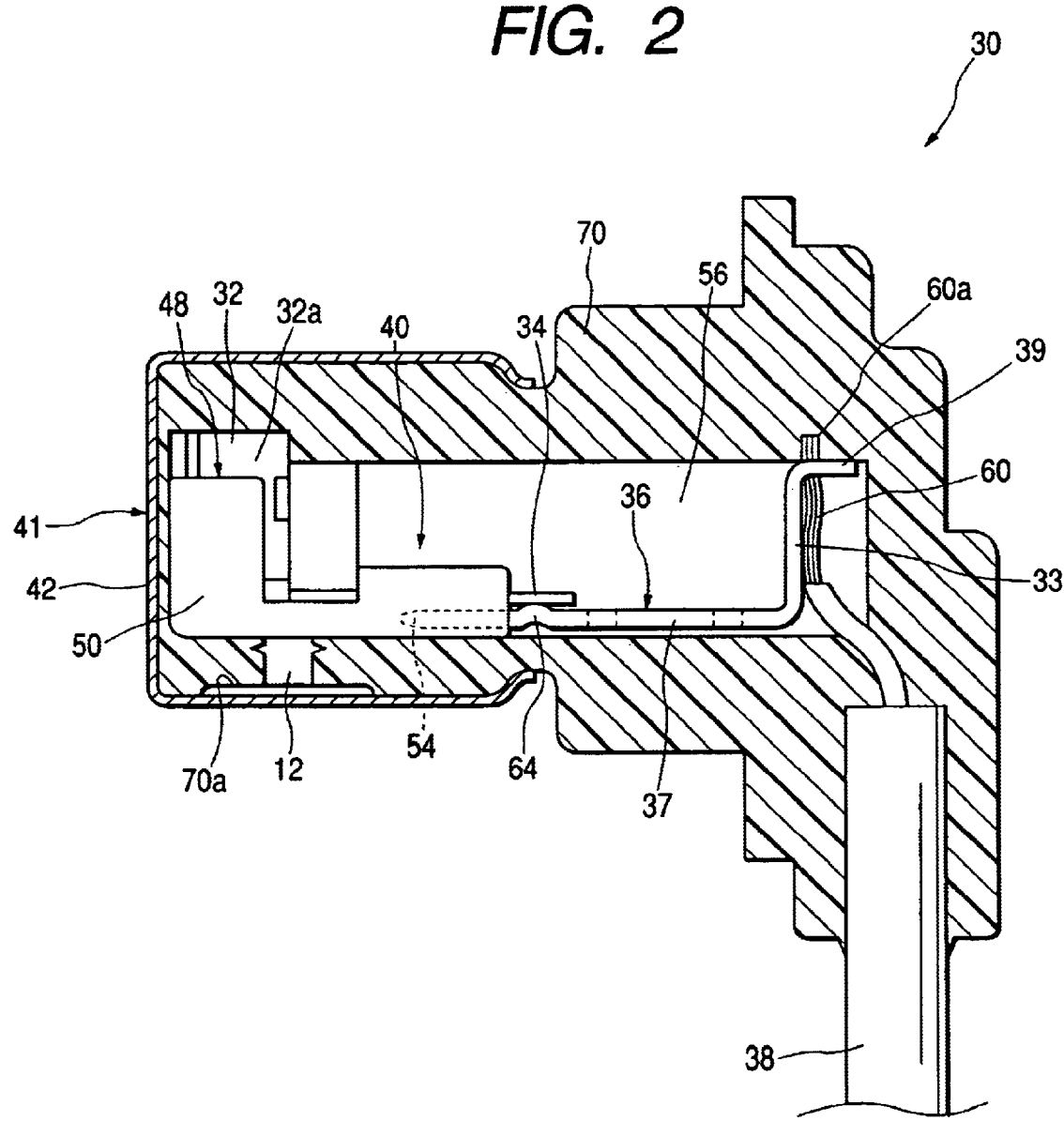
FIG. 2 is a sectional side view showing the internal construction of the wheel speed sensor.

In FIG. 1, a wheel speed sensor 30 is provided together with a brake system provided on each wheel of a vehicle and is disposed in such a manner as to confront a rotor of a magnetic material (not shown). The wheel speed sensor 30 is designed to detect the speed of the wheel using a detection element (a Hall IC or a MR element). The detection element is adapted to detect a change in voltage associated with a change in magnetic flux which occurs when irregularities or slit holes formed in the rotor pass through the detection element.

The wheel speed sensor 30 includes a Hall IC 32, which is an example of a detection element, terminal portions 36 adapted to be connected to leads 34 of the Hall IC 32, electric wires or cords 38 for transmitting detection signals from the Hall IC 32 and a holder portion 40 in which the terminal portions 36 and the Hall IC 32 are provided together.

The electric wires 38 are connected to the terminal portions 36 by welding, and the terminal portions 36 are connected, in turn, to leads 34 of the Hall IC 32 by welding. Thus, the Hall IC 32, which is a detection element, and the electric wires 38 are electrically connected together via the terminal portions 36.

Then, a resin sealed portion 70 is formed on the wheel speed sensor 30 in which the terminal portions 36 and the Hall IC 32 which are assembled to the holder portion 40 are sealed integrally with a resin.

The Hall IC 32 is sealed in the wheel speed sensor 30 at one end of a detecting portion 41. In addition, a metallic cap is fitted over this detecting portion 41 so as to attempt to ensure the protection of the Hall IC 32.

The electric wires 38 are disposed at an opposite position to the detecting portion 41. The electric wires 38 are constructed by two signal wires (conducting portions each comprising a collection of thin metallic wires) 60 which are each coated with a coating material.

Note that reference numeral 44 is a mounting member for mounting the wheel speed sensor 30 in the vicinity of an axle. Mounting holes 45 are formed in the mounting member 44 into through which bolts or the like can be passed.

Next, the configuration of the holder portion will be described.

A detection element fitting portion 48 is formed in one end of the holder portion 40 so that the Hall IC 32 can be fittingly mounted therein. This detection element fitting portion 48 is constituted by an IC holding portion 50 for grabbing a cylindrical main body portion 32a of the Hall IC 32 when the cylindrical main body portion 32a is fitted therein.

The IC holding portion 50 is formed into a partially cutaway cylindrical configuration which allows the main body portion 32a of the Hall IC 32 to be fitted in the interior thereof with no gap being formed therebetween. In addition, this IC holding portion 50 is also formed such that the diameter of an opening produced by cutting away an upper portion of the IC holding portion 50 becomes smaller than the diameter of the main body portion 32a of the Hall IC 32.

Consequently, when the Hall IC 32 is fittingly mounted in the detection element fitting portion 48 so formed, the Hall IC 32 is caused to approach toward the opening in the IC holding portion 50 and is then pressed against the opening in the IC holding portion 50.

Then, when the Hall IC 32 continues to be pressed in, the IC holding portion 50 is opened due to an elastic force, whereby the IC holding portion 50 is fitted in the inside of the IC holding portion 50 to be grabbed in place.

Figure 4:
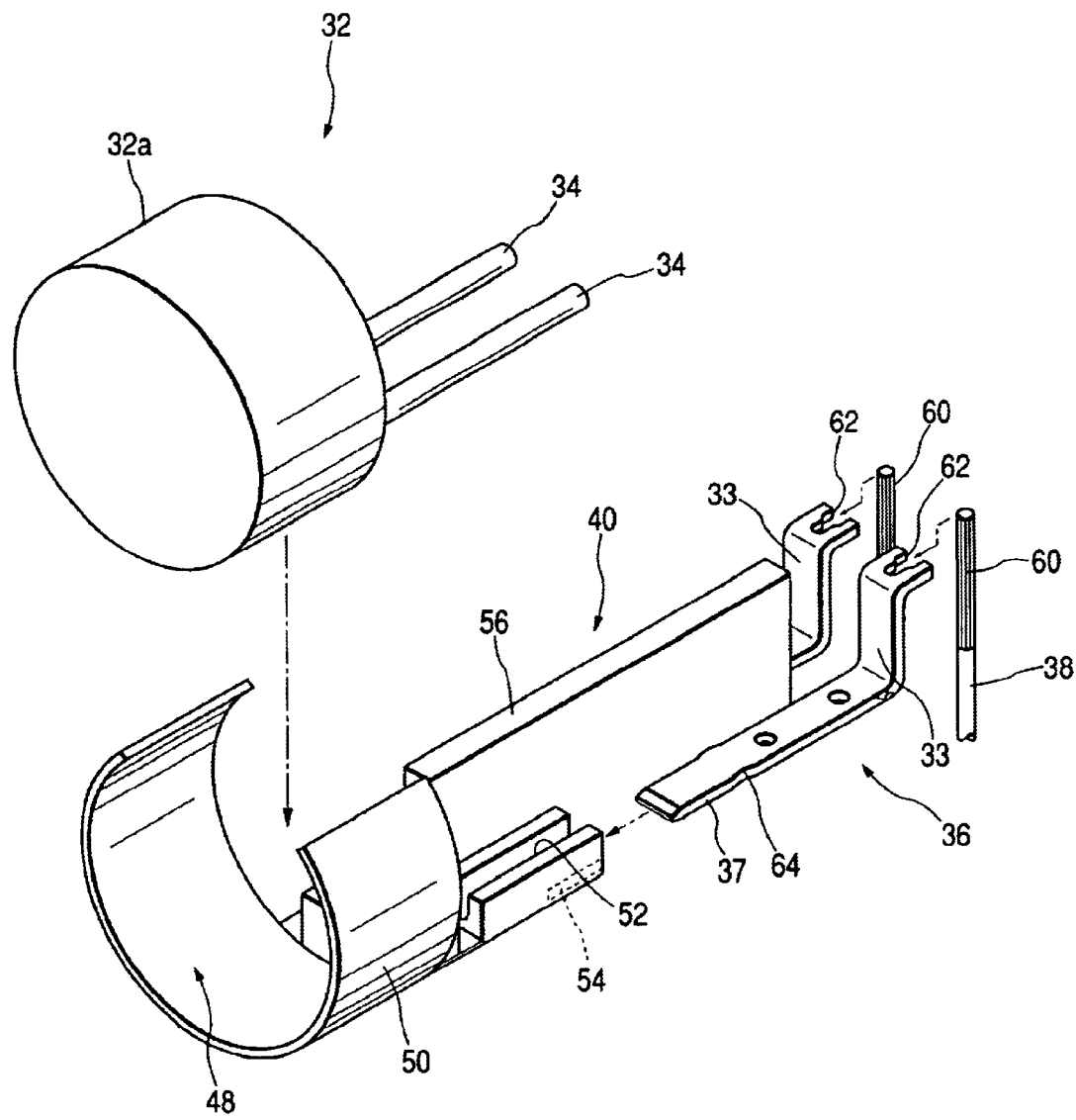
FIG. 4 is an exploded perspective view showing the assemblage of a Hall IC and a terminal portion to a holder portion.

In addition, Hall IC 32 can be fitted in the detection element fitting portion 48 to be grabbed in place therein not only from above, as shown in FIG. 4, but also from a side.

Accommodating grooves 52 are formed in the holder portion 40 rearward of the detection element fitting portion 48 for accommodating leads 34 of the Hall IC 32.

In addition, the number of accommodating grooves 52 so formed coincides with the number of leads 34 of the Hall IC 32, and in this embodiment, since the Hall IC 32 uses two leads, two accommodating grooves 52 are formed.

The length of the accommodating groove 52 is determined such that the lead 34 protrudes from the accommodating groove 52 when the Hall IC 32 is fitted in the detection element fitting portion 48.

Terminal fitting portions 54 are formed in a location of the holder portion 40 which is situated below the location where the respective accommodating grooves 52 are formed so that the terminal portions 36 are fitted therein from one end toward the other end of the holder portion 40 for accommodating there in the terminal portions 36.

A distal end portion (which will be described later) of a mounting piece 37 of the terminal portion 36 is accommodated in each of the terminal fitting portions 54.

The terminal fitting portions 54 are also formed in two positions in order to coincide with the number of leads 34.

In addition, a shielding plate 56 is formed between the respective terminal fitting portions 54 for preventing a contact of the respective terminal portions 36 or the respective electric wires 38 connected to the terminal portions 36, respectively.

The formation of the shielding plate 56 prevents the contact of the two terminal portions 36 and/or the electric wires 38 connected, respectively, to the terminal portions 36 with each other.

Figure 3:
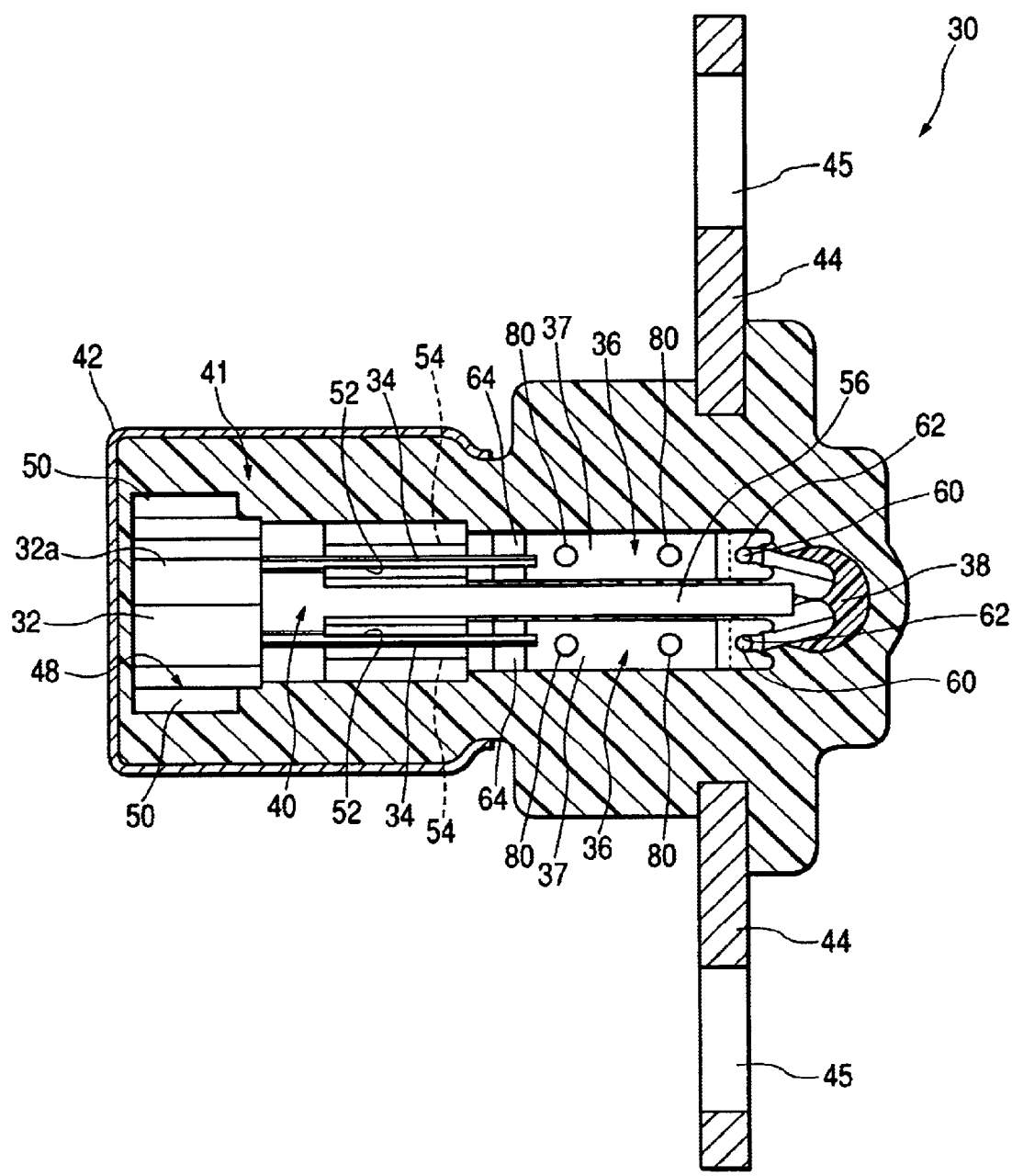
FIG. 3 is a sectional plan view showing the internal construction of the wheel speed sensor.

In addition, in FIG. 3, two holding holes 80 which can be held by a jig are drilled in an intermediate portion (a horizontal portion) of the terminal portion 36. The jig that is used to press fit the terminal portion 36 in the holder portion 40 are fitted in these holding holes 80. Further, since a resin passes through the holding holes 80 at the time of resin molding, the flowability of the resin can be improved. Since the resin is filled in the holding holes 80 to set therein at a resin-sealed portion 70, even if the electric wire 38 is pulled or deflected, the concentration of stress to a connecting portion of a bent portion 64 and a lead 34 can be relaxed by virtue of the biting of the sealing resin in the plurality of holding holes 80 so that the connecting strength can be maintained, thereby making it possible to improve the reliability of the sensor.

Reference numeral 12 denotes a supporting member (a rod-like projection) provided to support the holder portion 40 in a floating fashion within a cavity in the mold (not shown).

Figure 5A:
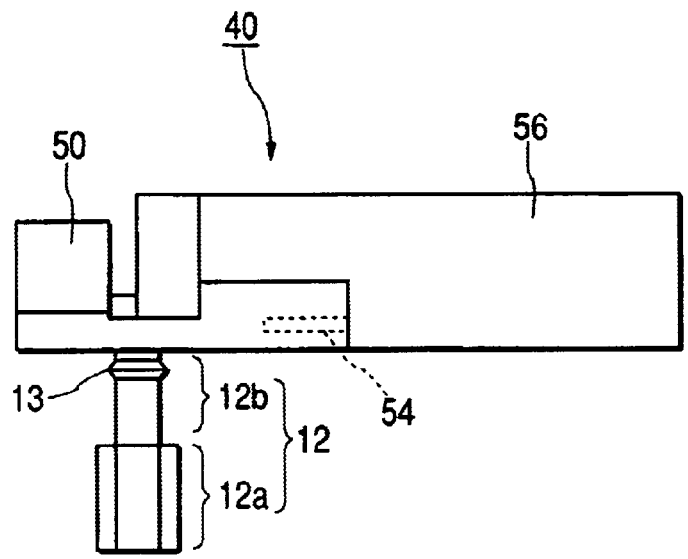
FIGS. 5A to 5C are respectively a front view of a holder portion, a plan view of the same, and an end view of a rod-like projection.

In FIG. 5A, a rod-like projection 12 is provided at an end of the holder portion 40 where an IC holding portion 50 is provided on an opposite side of the holder portion 40 to a side thereof where the IC holding portion 50 is situated. This rod-like projection 12 is sealed with a resin (insert molded) in a state in which an end 12a of the rod-like projection 12 is positioned outside a cavity in a mold while the other end 12b of the rod-like projection 12 is allowed to support the holder portion 40 in a floating fashion within the cavity. The rod-like projection 12 which projects outwardly of the resin-sealed portion 70 is cut to be removed with an air nipper or the like.

This rod-like projection 12 is provided at a position on the holder portion 40 which is, for example, an opposite face of the holder portion 40 to a face thereof where the IC holding portion 50 is provided. The rod-like projection 12 has preferably a polygonal cross section, so that the rod-like projection 12 neither rotates nor floats in a state in which the rod-like projection 12 is placed in the cavity in the mold with the electric wires 38 remaining connected to the holder portion 40. A projecting portion 13 having a wedge-like cross section is formed in a collar-like fashion at the other end 12b of the rod-like projection 12 (in the vicinity of the end of the rod-like projection 12 which faces the holder portion 40) so as to prevent the penetration of water which is absorbed from an interface with the resin-sealed portion 70.

Figure 5B:
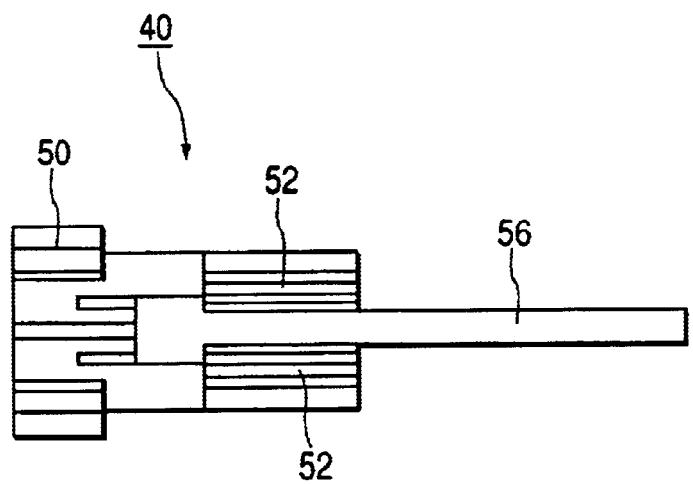

In FIG. 5B, the IC holding portion 50 is formed at one end of the holder portion 40, and concaved grooves 52 for holding the leads 34 from a Hall IC 32 are formed adjacent to the IC holding portion 50 in the holder portion 40. Inserting holes (terminal fitting portions) 54 into which one ends of the terminal portions 36 are inserted are formed in a side wall of the holder portion 40 at the other end thereof below the concaved grooves 52, whereby lead terminal portions disposed in the concaved grooves 52 are assembled to the holder portion 40 in such a manner as to be brought into abutment with the bent portions 64 of the terminal portions 36 which are press fitted in the inserting holes 54.

Figure 5C:

In addition, in this embodiment, as shown in FIG. 5C, the one end 12a of the rod-like projection 12 is formed so as to have a hexagonal cross section.

Next, the connection of the terminal portions with the Hall IC and the connection of the terminal portions with the cords will be described.

Figure 6:
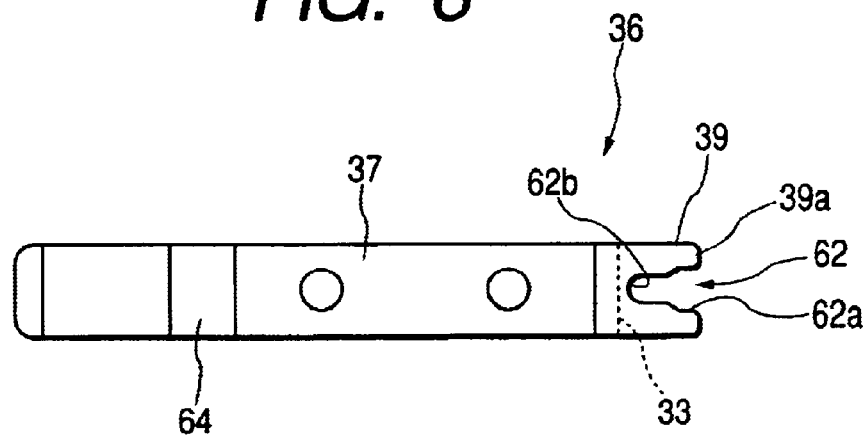
FIG. 6 is a side view of a terminal according to the invention.
Figure 7:
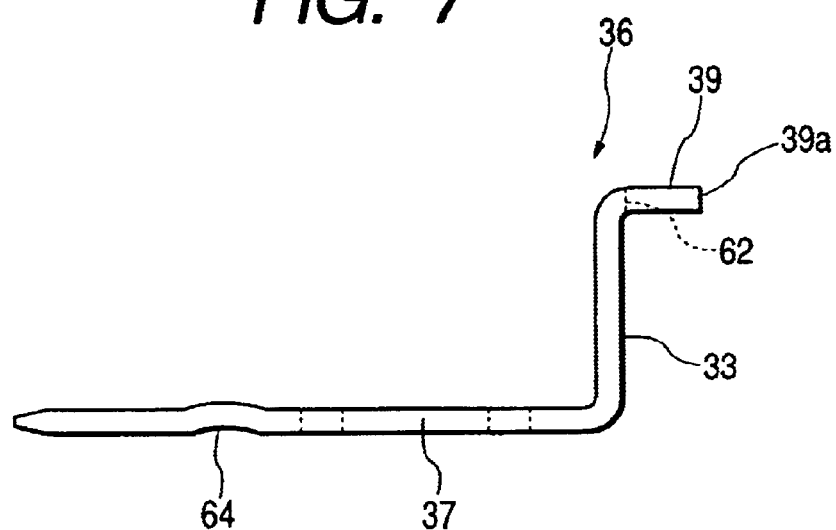
FIG. 7 is a plan view of the terminal shown in FIG. 6.
Figure 8:
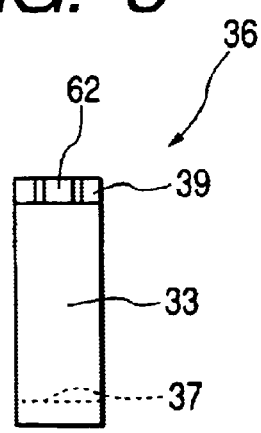
FIG. 8 is a front view of the terminal shown in FIG. 6.

Here, as shown in FIGS. 6, 7 and 8, the terminal 36 is a metallic member (a so-called terminal) for connecting an electronic component with an electric wire in which a conductor portion thereof is constituted by a plurality of thin metallic wires.

The terminal 36 shown in this embodiment is formed by bending a metallic piece which is an elongated plate-like body at two positions. The terminal portion 36 has a welding portion 33 to which the signal wires 60 of the electric wire 38 are welded and a holding piece 39 which is formed by bending one end of the welding portion 33 in a direction normal to the welding portion 33. In addition, as has been described above, the other end of the welding portion 33 is bent toward the Hall IC to thereby form a mounting piece 37 for mounting in the holder portion 40.

The welding portion 33 is formed into a flat configuration and the signal wires (conducting portion) 60 are connected to the welding portion 33 along a longitudinal direction thereof by welding. In addition, the holding piece 39 is formed at around a position where a distal end 60a of the conducting portion 60 reaches when it is welded to the weld portion 33.

The distal end 60a of the conducting portion 60 that is to be welded is accommodated in the holding piece 39, and formed in the holding piece 39 is a notched portion 62 which is a holding portion for holding the conducting to portion 60 in a bundled fashion so that the conducting portion does not get discrete.

The notched portion 62 is formed into a shape which is notched from a distal end 39a of the holding piece 39 toward the weld portion 33 in such a manner that an opening end of the notched portion constitutes a large-diameter portion 62a and a weld portion 33 end of the notched portion constitutes a small-diameter portion 62b whose diameter is smaller. It is preferable to form the small-diameter portion 62b such that the diameter of the small-diameter portion 62b becomes slightly smaller than the diameter of the conducting portion 60 which is to be held by the small-diameter portion 62b since such a construction can ensure the holding of the conducting portion 60.

Thus, since the notched portion 62 is formed in such a manner that the diameter thereof is reduced in a gradual or stepped fashion from the large-diameter portion 62a toward the small-diameter portion 62b, when attempting to accommodate the conducting portion 60 in the notched portion 62, the accommodation of the conducting portion 60 in the notched portion 62 can be facilitated. Moreover, once the conducting portion 60 is accommodated in the notched portion 62, the conducting portion 60 can securely be kept bundled in the notched portion 62, eliminating thereby a risk that the conducting portion 60 gets discrete.

In addition, a distal end portion of the notched portion 62 (a distal end of the small-diameter portion 62b) is provided so as to be positioned on the same plane as a weld surface of the weld portion 33 where welding is implemented or to be positioned apart from the weld surface toward the distal end of the holding piece 39. Namely, the notched portion 62 is formed in the holding piece 39 only but is not formed in such a manner as to extend from the holding piece 39 to the weld portion 33.

According to the construction, when the distal end 60a of the conducting portion 60 that is to be welded is accommodated in the notched portion 62 there is caused no risk that the distal end of the conducting portion to be welded is caused to be oriented toward the inside of the weld portion 33. Consequently, since the conducting portion 60 can easily be accommodated in the notched portion 62 that is so constructed, the individual thin metallic wires are reluctant to get discrete.

Figure 9:
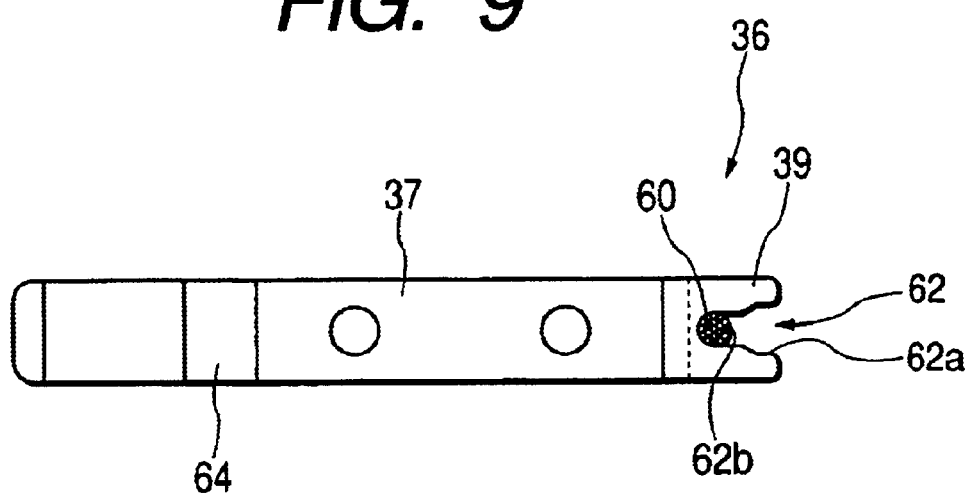
FIG. 9 is a plan view of the terminal showing a conductor portion being accommodated in a notched portion.
Figure 10:
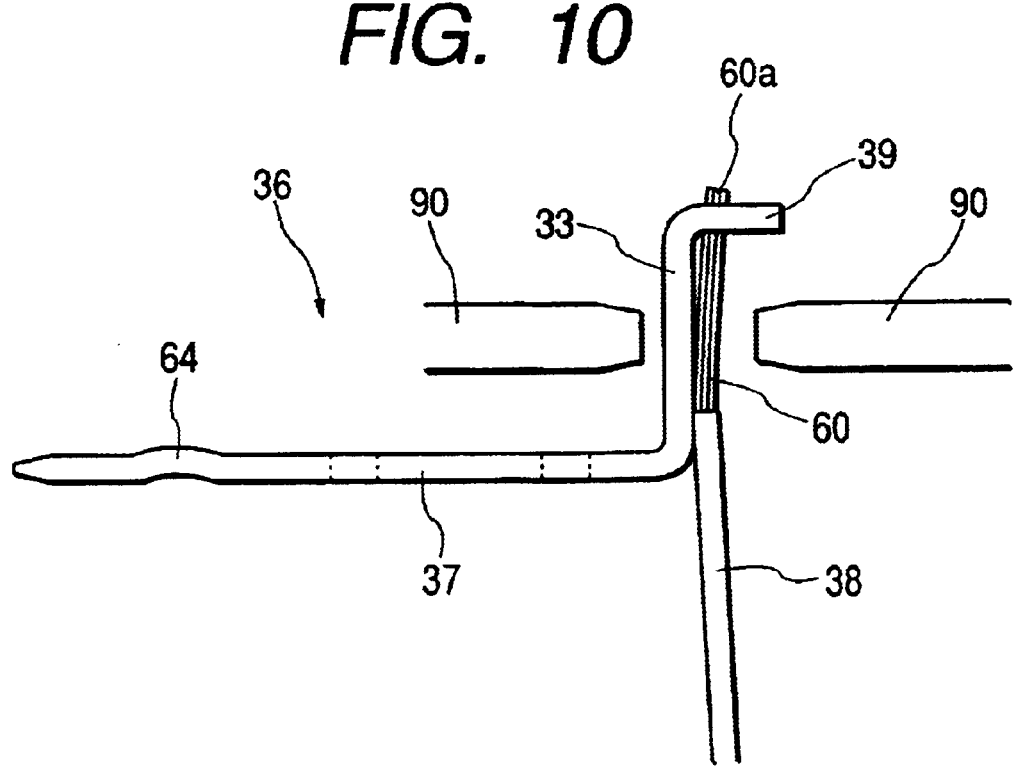
FIG. 10 is an explanatory view showing an electric wire being welded to the terminal.
Figure 11:
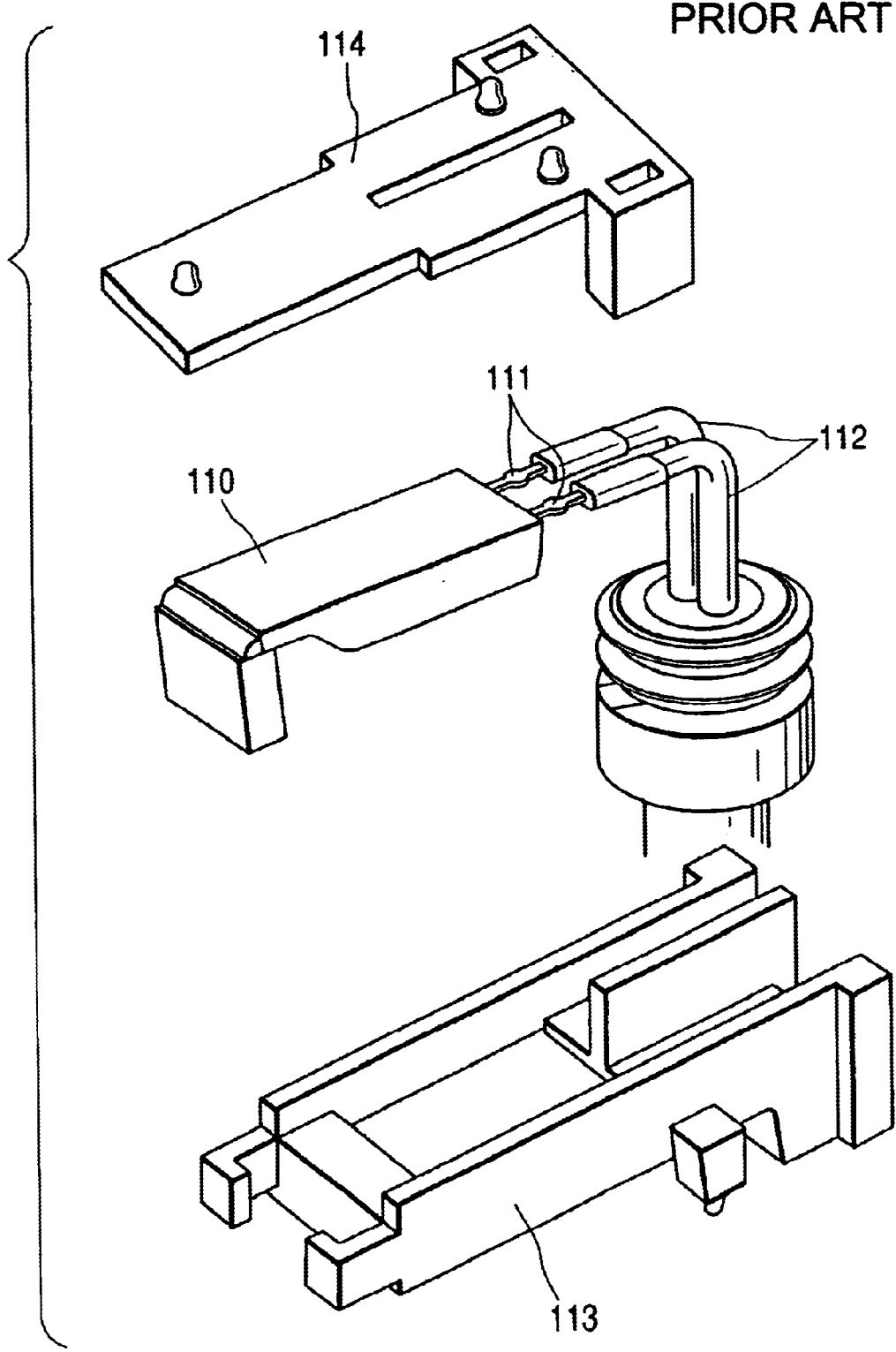
FIG. 11 is an explanatory view showing the internal construction of a conventional wheel speed sensor.
Figure 12:
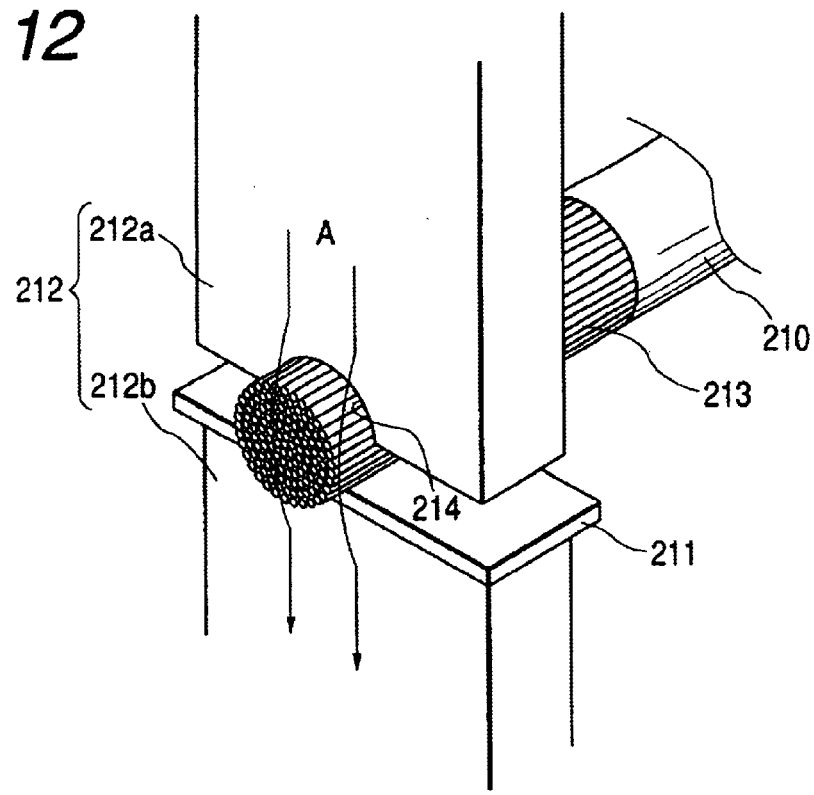
FIG. 12 is an explanatory view showing the welding of a conventional terminal and an electric wire.
Figure 13:
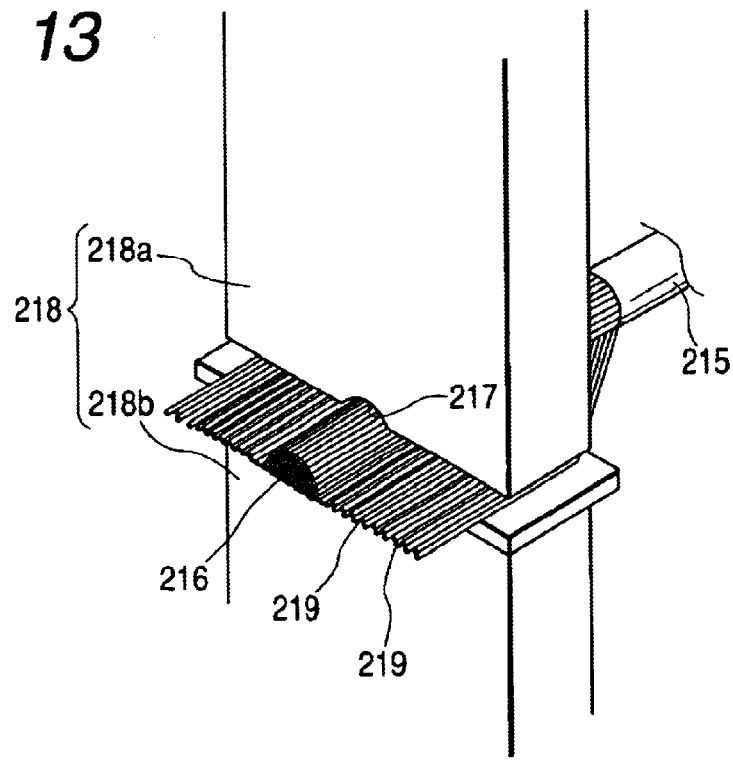
FIG. 13 is an explanatory view showing the welding of another conventional terminal and another electric wire.

Next, based upon FIGS. 9 and 10, a method will be described for welding an electric wire in which a conducting portion thereof is constituted by a plurality of thin metallic wires to the terminal that is constructed as described above.

Firstly, the distal end 60a of the conducting portion 60 is accommodated in the notched portion 62. A portion of the conducting portion 60 of an electric wire 38 is brought into abutment with the weld portion 33 of the terminal 36.

Next, two electrodes 90, 90 are disposed to confront each other with the weld portion 33 of the terminal 36 being held therebetween.

Confronting surfaces of the two electrodes 90, 90 are both flat. In other words, since electrodes whose surfaces adapted to be brought into abutment with the conducting portion 60 are formed flat can be used, the electrodes 90 can be pressed against the conducting portion 60 without paying any attention to a positional relationship between the conducting portion 60 and the electrodes 90 at the time of welding.

Then, the two electrodes 90, 90 are moved to approach each other. When the respective electrodes 90, 90 come into abutment with the conducting portion 60 and the weld portion 33 the both electrodes 90, 90 are then pressed such that pressures are applied thereto gradually.

Next, when a pressure between the electrodes 90 reaches or exceeds a pressure set in advance an electric current is caused to flow between the electrodes 90.

The conducting portion 60 and the weld portion 33 of the terminal 36 are heated by allowing the electric current to flow between the electrodes 90, 90, whereby required welding is implemented.

On the other hand, the bent portion 64 is formed on the mounting piece 37 of the terminal portion 36 for connection with the lead 34 of the Hall IC 32. The bent portion 64 is formed at a certain position along the length of the mounting piece 37 in such a manner as to project toward the lead 34 of the Hall IC 32 so as to be brought into abutment therewith when the terminal portion 36 is fitted into the terminal fitting portion 54.

In other words, when the terminal portion 36 is fitted in the terminal fitting portion 54 and the Hall IC 32 is fitted in the detection element fitting portion 48 the lead 34 of the Hall IC 32 comes into abutment with the bent portion 64.

Then, after the Hall IC 32 and the terminal portion 36 are fitted in the detection element fitting portion 48 and the terminal fitting portion 54, respectively, the lead 34 of the Hall IC 32 and the bent portion 64 on the terminal portion 36 are welded together for connection.

In addition, the terminal portion 36 and the lead 34 of the Hall IC 32 may be provided so that they are disposed at very close positions rather than being brought into abutment with each other when the terminal portion 36 is fitted in the terminal fitting portion 54 and the Hall IC 32 is fitted in the detection element fitting portion 48.

Thus, even if the lead 34 and the bent portion 64 on the terminal portion 36 are not in a perfect abutment with each other when they are assembled into the holder portion 40, welding can easily be performed which is required to connect the lead 34 and the terminal portion 36 together, and stress is made difficult to be applied to the connecting portion between the lead 34 and the terminal portion 36, whereby a strong connection can be provided.

Next, in resin sealing (insert molding) the wheel speed sensor 30, the holder portion 40 is positioned within the cavity in the mold (a stationary mold half) and is accommodated therein by fitting the rod-like projection 12 in a recessed portion (not shown) formed in the mold outside the cavity. To be specific, the Hall IC 32 and the terminal portions 36 are assembled to the holder portion 40 in advance in such a manner that the Hall IC 32 and the terminal portions 36 are electrically connected to each other, and the holder portion 40 with the Hall IC 32 and the terminal portions 36 is then placed in the cavity in the mold (the stationary mold half) with the electric wires 38 being connected to the terminal portions 36. Since the rod-like projection 12 having the hexagonal cross section is fitted in the chamfered recessed portion (not shown) formed in the mold outside the cavity, the holder portion 40 neither rotates nor floats within the cavity by virtue of the deflection of the cords 38, and therefore, the holder portion 40 is supported in a floating fashion at a central portion of the cavity.

Next, a sealing resin is injected into the cavity for insert molding with the holder portion 40 being clamped by the mold (a movable mold half and the stationary mold half) and supported in the floating fashion within the cavity. As this occurs, even if a resin pressure is applied to the holder portion 40 which is being supported in the floating fashion within the cavity, since the holder portion 40 is clamped such that the holder portion 40 is prevented from rotating and deviating in position by the rod-like projection 12 outside the cavity, the sealing resin is allowed to flow as far as the periphery of the holder portion 40 to seal the same, whereby the sealing resin is allowed to flow around the whole periphery of the holder portion 40 uniformly so that not only the deformation of the electronic component such as the Hall IC 32 is prevented but also the exposure of the holder portion 40 is prevented to thereby prevent the penetration of water or the like from an exposed portion which would otherwise be generated, thereby making it possible to improve the molding quality of the wheel speed sensor.

Next, after the sealing with the resin has been completed, a molded product so formed is then taken out of the mold, and a part of the rod-like projection 12 projecting outwardly of the resin-sealed portion 70 is then cut with an air nipper. The periphery of the cut portion of the rod-like projection 12 is formed into a concave surface 70a, so that a cut piece remaining on the cut surface does not project from the peripheral surface of the resin-molded portion 70. A metallic bottomed cylinder-like cap portion 42 is fitted over the periphery of the resin-sealed portion 70 to protect the sensor. Note that the cap 42 may be omitted.

In the embodiment described above, it is desirable that the rod-like projection 12 which is provided on the holder portion 40 in such a manner as to project therefrom is provided at a position where the holder portion 40 can be handled to be supported in a generally well balanced fashion with the Hall IC 32, the terminal portions 36 and the cords 38 all being connected to the holder portion 40. In addition, it goes without saying that various modifications may be made to the invention without departing the spirit and scope of the invention. For example, the cross section of the rod-like projection 12 is not limited to the hexagonal cross section but may take cross sections of other shapes.

Thus, while the invention has been described variously by providing the preferred embodiment, the invention is not limited to the embodiment and may, of course, be modified in variously without departing from the spirit and scope of the invention.

For example, while the Hall IC is used as an example of a detection element in this embodiment, a detection element for detecting the rotation of the axle does not have to be limited to the Hall IC.

In addition, the notched portion 62 formed in the holding piece has been described in the embodiment as an example of the holding portion 40 for holding the conducting portion 60.

However, the holding portion may be formed into any configuration provided that it can hold the conducting portion in such a manner that the conducting portion does not get discrete to the individual thin metallic wires. For example, a hole may be the holding portion which is formed in the holding piece for allowing the conducting portion to pass therethrough.

According to the wheel speed sensor of the invention, since the holder portion is constituted by the detection element fit-in portion in which the detection element is fitted and the terminal fit-in portions in which the terminal portions are fitted and the detection element fit-in portion and the terminal portion fit-in portions are disposed such that the leads of the detection element are brought into abutment with or proximity to the predetermined locations of the terminal portions, the assemblage of the respective component parts to the holder portion prior to sealing with the resin can be improved to thereby improve the production efficiency. In addition, since the leads can be connected to the predetermined locations of the terminal portions using a connecting means such as welding or soldering after the detection element and the terminal portions have been fitted in the holder portion, when compared with the conventional wheel speed sensor in which the leads of the detection element and the terminal portions are connected to each other before they are accommodated in the accommodating portion, stress is made difficult to be applied to the leads of the detection element and the terminal portions, thereby improving the reliability in connection between the leads of the detection element and the terminal portions.

In addition, in the event that the leads of the detection element and the predetermined locations of the terminal portions are connected by welding, the connection between the leads of the detection element and the terminal portions is made stronger.

According to the construction of the wheel speed sensor and the method for producing the same, since the rod-like projection is provided on the holder portion in such a manner as to project therefrom, the holder portion is held in the floating fashion within the cavity and is then resin molded therein by positioning and holding the rod-like projection outside the cavity, and the rod-like projection which projects outwardly of the cavity is removed after resin molding, there is no risk that the holder portion rotates or deviates within the cavity by virtue of the deflection of the cords, whereby the holder portion can be positioned and supported in the floating fashion at the central portion of the cavity. Thus, since the holder portion to which the cords are connected is easy to be positioned and set in the mold, the productivity can be increased. Moreover, not only the deformation of the electronic component held on the holder portion but also the exposure of the holder portion can be prevented by allowing the sealing resin to flow around the whole periphery of the holder portion uniformly, whereby the penetration of water from an exposed portion that would otherwise be generated can be prevented, thereby making it possible to improve the molding quality of the wheel speed sensor. In addition, since the part of the rod-like projection which projects outwardly of the resin-sealed portion is removed, there is no risk that the resin-sealed portion is enlarged excessively.

In addition, according to the construction of the wheel speed sensor, since the rod-like projection has the hexagonal cross section, even if the holder portion is small in size, there is no risk that the holder portion rotates within the cavity by virtue of the resin pressure, and therefore the positioning of the holder portion within the cavity can be ensured.

Furthermore, according to the construction of the wheel speed sensor, since the rod-like projection having the hexagonal cross section is provided only at one position on the holder portion in such a manner as to project therefrom so as to support the holder portion within the cavity, in the event that the hexagonal cross section is given to the rod-like projection, even with the single rod-like projection, the prevention of rotation of the holder portion within the mold can be attained sufficiently, thereby making it possible to make the mold and the wheel speed sensor itself smaller in size.

According to the terminal of the invention, since the holding portion is formed for holding the conducting portion in a bundled fashion, the conducting portion can be welded to the terminal without getting discrete to the individual thin metallic wires.

In addition, in the event that the holding portion is formed as the notch which can hold therein the conducting portion, the conducting portion that is to be welded can be held extremely easily.

Furthermore, since the terminal is generally formed into the flat plate-like shape and has the weld portion which is the portion to which the conducting portion is welded and the holding piece formed by bending the weld portion at the position where the distal end of the conducting portion is located when the conducting portion is welded to the weld portion and the holding portion is formed in the holding piece, the distal end of the conducting portion is also allowed to approach the holding portion automatically when attempting to approach the conducting portion to the weld portion at the time of welding, whereby the holding of the conducting portion can be facilitated further.

According to the welding method of the invention, since the conducting portion is welded to the terminal after the conducting portion has been held by the holding portion, the conducting portion can be welded without getting discrete.

What is claimed is:

1. A terminal made of a metal to which an electric wire in which a plurality of thin metallic wires are bundled together to constitute a conducting portion is connected by welding, comprising:

a holding portion formed in the vicinity to a location of which the conducting portion is welded, the holding portion holds the conducting portion in a bundled state, wherein the holding portion is a notch holding the conducting portion therein.

2. The terminal according to claim 1, wherein the terminal is formed into a substantially flat plate and comprises a weld portion to which the conducting portion is welded and a holding piece which is bent from the weld portion at a position where a distal end of the conducting portion is located when the conducting portion is welded to the weld portion, and wherein the holding portion is formed in the holding piece.

3. The terminal according to claim 2, wherein the notch is positioned at a substantially perpendicular angle to the location to which the conducting portion is welded.

4. The terminal according to claim 2, wherein the notch is formed at a distal end of the holding piece.

5. A method for welding an electric wire in which a plurality of thin metallic wires are bundled together to constitute a conducting portion to a terminal made of a metal, the method comprising the steps of:

preparing the terminal according to claim 1, the terminal having a holding portion formed in the vicinity to a location of the terminal to which the conducting portion is welded, for holding the conducting portion in a bundled state;

holding the conducting portion in the holding portion; and welding the conducting portion and the terminal together.

6. The terminal according to claim 1, wherein the notch is positioned at a distal end of the holding portion.

7. The terminal according to claim 1, wherein the notch includes an opening end having a larger diameter portion and a weld portion end having a smaller diameter portion.

8. The terminal according to claim 7, wherein the smaller diameter portion is smaller than a diameter of the conducting portion which is to be held by the smaller diameter portion.

9. The terminal according to claim 7, wherein the notch is formed such that the diameter is reduced in a gradual or stepped fashion from a larger diameter portion toward a smaller diameter portion.

10. The terminal according to claim 7, wherein a distal end of the smaller diameter portion of the notch is positioned on a same plane as the location to which the conducting portion is welded.

11. The terminal according to claim 7, wherein a distal end of the smaller diameter portion of the notch is positioned apart from the location which the conducting portion is welded.

12. The terminal according to claim 1, wherein the holding piece is substantially orthogonal to one end of the terminal in a direction normal to the location which the conducting portion is welded.

13. The terminal according to claim 12, wherein another end of the terminal is positioned in an opposing direction to the one end thereby forming a mounting piece.

14. The terminal according to claim 13, further comprising a bent portion formed on the mounting piece.

15. The terminal according to claim 14, wherein the bent portion projects upward towards a notch in the holding portion.

16. The terminal according to claim 1, wherein the holding portion is substantially orthogonal to the welding portion.

17. A terminal made of a metal to which an electric wire in which a plurality of thin metallic wires are bundled together to constitute a conducting portion is connected by welding, comprising:

a welding portion having a surface to which the conducting portion is welded; and a holding portion extending away from a plane of the welding surface, the holding portion holding the conducting portion in a bundled state for welding thereof.

18. The terminal according to claim 17, wherein the holding portion includes a stepped notch portion at a distal end, a first portion of the stepped notch portion having a larger diameter than a second portion holding the conducting portion in the bundled state, the second portion having a diameter smaller than a diameter of the conducting portion.

* * * * *